United States Patent [19]

Basset et al.

[11] 4,409,434

[45] Oct. 11, 1983

[54] TRANSISTOR INTEGRATED DEVICE, PARTICULARLY USABLE FOR CODING PURPOSES

[75] Inventors: Jean-Claude Basset, Paris; Alain Meinguss, Meudon la Foret, both of France

[73] Assignee: Electronique Marcel Dassault, Paris, France

[21] Appl. No.: 211,970

[22] Filed: Dec. 1, 1980

[30] Foreign Application Priority Data

Nov. 30, 1979 [FR] France ................... 79 29588
Nov. 30, 1979 [FR] France ................... 79 29589

[51] Int. Cl.³ .................. H01K 1/00; G06K 19/06
[52] U.S. Cl. .................. 178/22.19; 340/825.33; 357/45; 307/468; 235/441
[58] Field of Search ............ 357/41, 45, 36, 59, 357/71; 307/468, 469, 296 A; 340/825.33; 235/441, 487, 492; 178/22.19

[56] References Cited

U.S. PATENT DOCUMENTS

| | | | |
|---|---|---|---|
| 3,634,656 | 1/1972 | Krechmer et al. | 235/450 |
| 3,678,250 | 7/1972 | Dethloff et al. | 235/61.11 R |
| 3,914,855 | 10/1974 | Cheney et al. | 29/571 |
| 4,004,133 | 1/1977 | Hannan et al. | 235/492 |
| 4,034,211 | 7/1977 | Horst et al. | 235/487 |
| 4,041,459 | 8/1977 | Horninger | 307/468 |
| 4,045,811 | 8/1977 | Dingwall | 357/41 |
| 4,049,975 | 9/1977 | Colaco | 357/36 |
| 4,084,105 | 4/1978 | Teranishi et al. | 307/205 |
| 4,105,156 | 8/1978 | Dethloff | 235/441 |
| 4,142,674 | 3/1979 | Walton | 235/487 |
| 4,161,662 | 7/1979 | Malcolm et al. | 307/213 |
| 4,190,778 | 2/1980 | Krause | 307/296 A |
| 4,210,465 | 7/1980 | Brower | 357/59 |
| 4,212,684 | 7/1980 | Brower | 357/59 |
| 4,256,955 | 3/1981 | Giraud et al. | 235/441 |
| 4,268,950 | 5/1981 | Chatterjee et al. | 357/45 |
| 4,290,079 | 9/1981 | Carpenter et al. | 357/71 |
| 4,295,039 | 10/1981 | Stuckert | 235/492 |

FOREIGN PATENT DOCUMENTS 1519995 8/1978 United Kingdom .

*Primary Examiner*—Sal Cangialosi
*Attorney, Agent, or Firm*—Pollock, Vande Sande & Priddy

[57] ABSTRACT

In a transaction card such as a credit or payment card provided with an integrated circuit for performing and recording the transaction, communications between the card and an access terminal must be coded so as to prevent fraud attempts. An integrated circuit coding device for coding or decoding a message in accordance with a confidential coding key comprises active transistors, and passive transistors, i.e. permanently blocked and/or permanently conductive, interconnected in such a way that observation of such circuit by means of an electronic microscope does not allow the determination of the confidential key which is implemented by the circuit.

23 Claims, 16 Drawing Figures

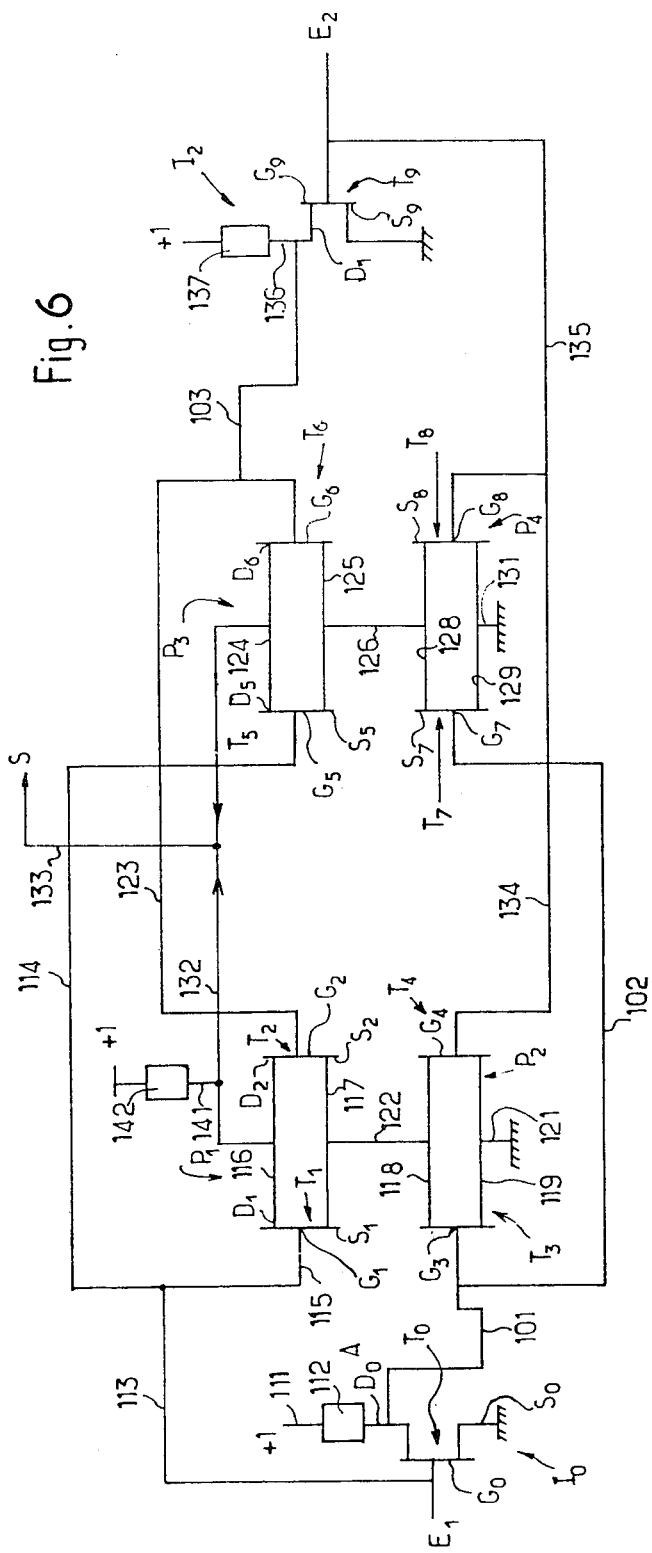
Fig. 6
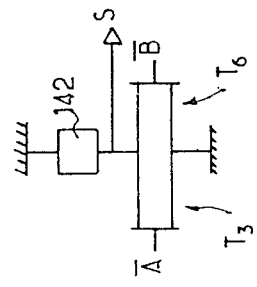
Fig. 8
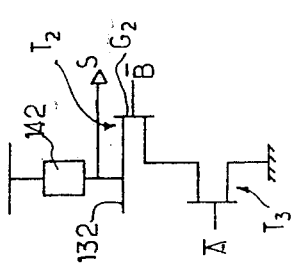
Fig. 9
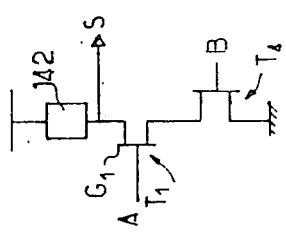
Fig. 10
Fig. 7

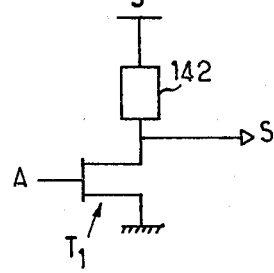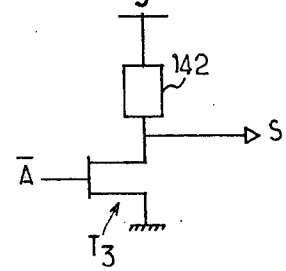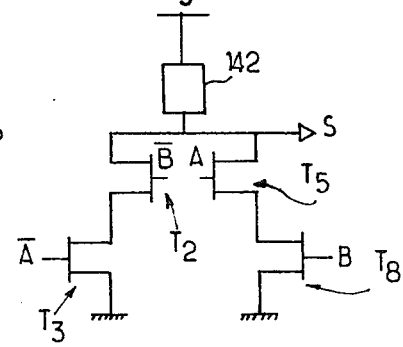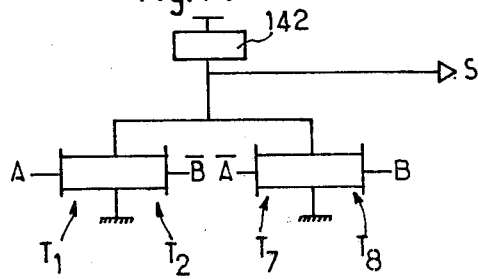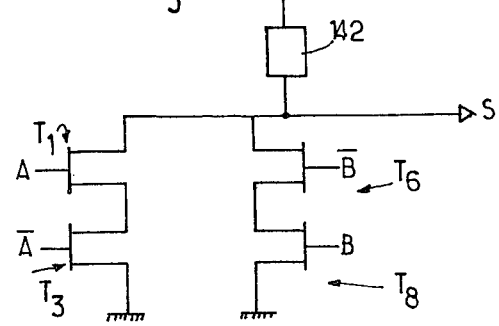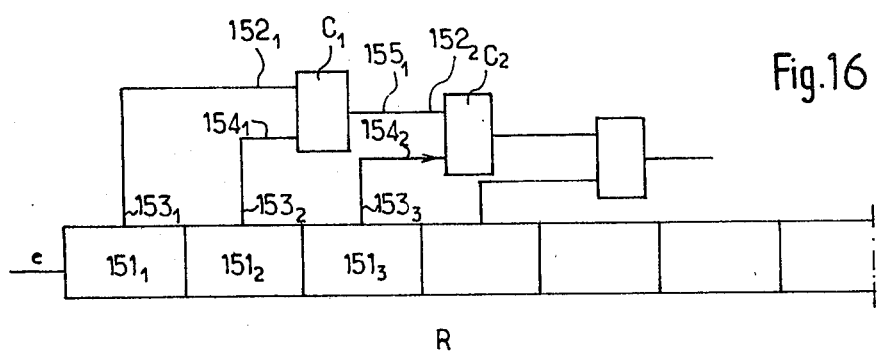

TRANSISTOR INTEGRATED DEVICE, PARTICULARLY USABLE FOR CODING PURPOSES

The invention relates to a transistor integrated circuit devices, usable notably for coding purposes.

A MOS transistor integrated circuit is made on a portion of a silicon wafer on which there has been created, through a succession of chemical and/or physico-chemical and/or purely physical treatments, MOS transistors as well as electrical junctions between said transistors, by calling upon masks, thereby producing a circuit as previously defined by one or several drawings.

The configuration of the integrated circuit, and its function, may, later on, be reconstructed through simple microscopic observation.

Such a possibility of reconstructing an integrated circuit brings about disadvantages when said circuit is intended to introduce coding of information which one wishes to keep confidential. It is for example the case of circuits which are part of an electronic circuit card intended for facilitating transactions of a banking or commercial nature. It is also the case of a circuit concerning a message of some sort which one wishes to keep confidential.

A MOS transistor circuit device according to the invention obviates such disadvantages.

The invention is based on the remark that the silicon transformations, at the atomic scale, which bring some portions of the silicon to function as a drain, others to function as a source, others again to function as a grid or gate, as transistors elements, are undetectable when observed, even with an electron microscope.

A transistor circuit according to the invention is characterized in that, among the multiplicity of transistors it comprises, a number of them effectively function as transistors, while others function as the passive part of interrupters or short-circuits, so that from the same diagram comprising a multiplicity of transistors, it is possible to produce various types of circuits according to the distribution of the parts played by the transistors which form operative transistors, interrupting transistors and short-circuit transistors.

In a circuit device according to the invention, the conductive tracks connecting the transistors do not allow, when being observed, reconstruction of the effectively operative diagram, since some of them connect transistors playing the part of an interrupter or a short-circuit, so that the circuit device and the logical function or functions it performs can be considered as really cyphered or encrypted.

The invention has its use in the making of a register device for the introduction of coding polynomial. Whereas, hitherto, the observation of the output circuits from the register cells allows reconstituting the polynomial, the register coding device according to the invention comprises an output circuit for each of the cells and, in the case of a series register, transistors for each of the output circuits, and it is the nature of the MOS transistors, depending on the doping introduced, and undetectable when being observed, that provides the coding circuitry.

The manufacturing method of a circuit device according to the invention is, as a whole, similar to that used for the manufacture of an integrated circuit, for example with MOS transistors.

However, it includes means for allowing the metering of the doping, no doping being introduced in some locations of the silicon wafer, and thus no transistor formed, or the doping being insufficient for obtaining an operative transistor.

Such a selection can be obtained by using masks.

It can also be obtained by adjusting the degree of action of the means used for the doping, either by setting the duration of the action, or by setting an electrical voltage from which depends the depth of the action, or again by the dimensions and/or the lay-out of openings formed in a mask, etc.

The selection may be carried out by whatever the means used for the doping: chemical diffusion, ionic bombardment, etc.

In the following description which is given by way of example, reference is made to the accompanying drawings wherin:

FIG. 6 shows the topology of a logic circuit usable for carrying out the invention;

FIGS. 7 to 15 are diagrams of circuits which can be formed from the circuit of FIG. 6;

FIG. 16 shows another embodiment of the invention.

A shift register R (FIG. 1) comprising ten compartments or cells, numbered from 0 to 9, is adapted for introducing a polynomial coding of information applied to its input e. The standard configuration shown in FIG. 1 corresponds to the coding by the following polynomial, chosen as an example:

$$x_0 + x_5 + x_7 + x_9$$

To this end, the cell 9 is connected by a conductor $C_9$ to an exclusive OR gate $P_{7.9}$ the other input of which is connected by a conductor $C_7$ to cell 7. The output of gate 7.9 is connected to a first input of a second gate $P_{5.7.9}$, the other input of which is connected by the conductor $C_5$ to cell 5, and the output of gate $P_{5.7.9}$ is connected to a first input of a gate $P_{0.5.7.9}$ the other input of which is connected by a conductor $C_0$ to cell $c_0$, the coded information being present at the output s of the device, each of the gates P being made of MOS transistors.

The observation with an electron microscope of the portion surrounded by the rectangle shown in a dashed line permittted the determination of the coding polynomial.

Figure 2:
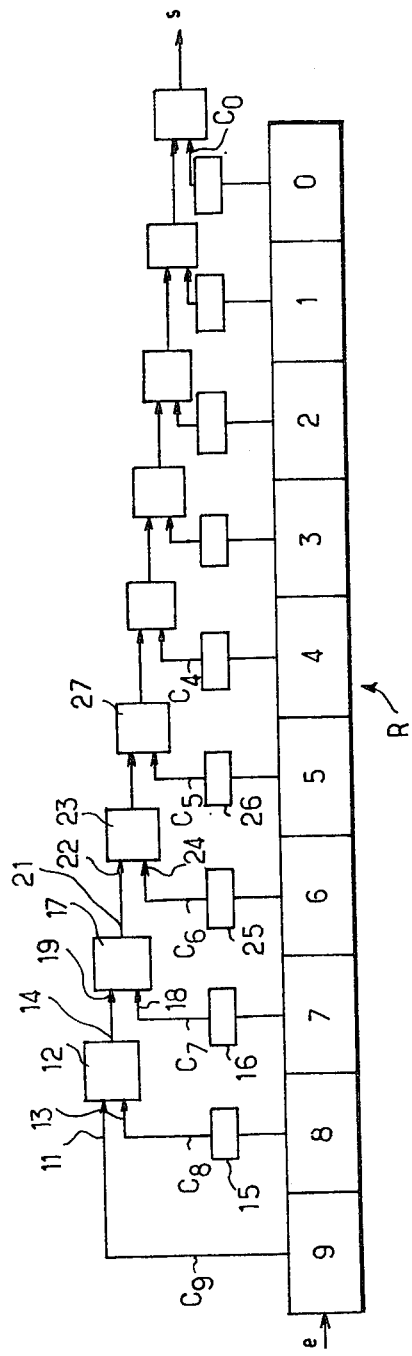
FIG. 2 is a diagram of a register device according to the invention.

The device according to the invention providing the same polynomial coding, but cyphered, is schematically shown in FIG. 2. It comprises the same reigster R with ten cells 0, 1, etc. 9, at the input e of which is applied the incoming information to be coded. From each of the cells is issued a conductor $C_9$, $C_8$, ... $C_0$. Conductor $C_9$ connects electrically cell 9 to the input 11 of a transistor circuit 12 having a second input 13, the circuit 12 having transistors brought to a state such that it functions as a short-circuit between one or the other of its inputs 11 and 13 and its output 14. A passive closed circuit transistor, adapted for functions as a short-circuit, is symbolized in FIG. 3.

Figures 3, 4, 5:
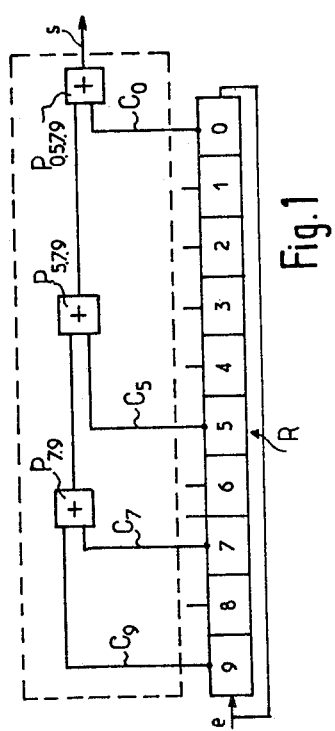
FIG. 3 is a symbol representative of a passive transistor in a condition of short-circuit or closed circuit.
FIG. 4 is a symbol representative of a passive transistor, in a permanent blocking or open circuit condition.
FIG. 5 is a symbol representative of an active transistor with two switchable conditions.

On conductor $C_8$ is interposed a passive "transistor" 15 the state of which is permanent, functions as an interrupter, or open circuit, as is schematically shown by the symbol of FIG. 4.

On conductor 7 connected from cell 7 is provided a short-circuit "transistor" 16 of the type shown in FIG. 3 and the exclusive OR gate 17 is connected by one of its inputs 18 to transistor 16, and by its other input 19 to the output 14 of circuit 12. The transistors constituent of gate 17 are active transistors with two conditions, blocked and conductive, as is usual as represented by the symbol of FIG. 5.

The output 21 of gate 17 therefore provides the assembly formed by two of the terms of the polynomial, viz.:

$$x_9 + x_7$$

The output 21 is connected to the first input 22 of a circuit 23 having transistors in short-circuit and the other input 24 of which is connected to cell 6 through a transistor 25 of the type shown in FIG. 3, functioning as an interrupter.

On conductor $C_5$ is interposed a transistor circuit 26 playing the part of a short-circuit, and the OR exclusive circuit 27 comprises transistors of the usual type. On conductor $C_4$ is interposed a transistor-interrupter and the same applies to conductors $C_3$, $C_2$, $C_1$. On conductor $C_0$ however is interposed a transistor of the short-circuit type, shown in FIG. 3.

At the output s is present the information coded by polynomial:

$$x_0 + x_5 + x_7 + x_9$$

Figure 1:
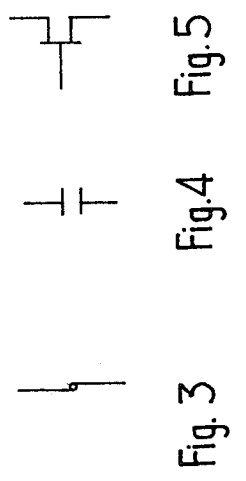
FIG. 1 is a diagram of a known register device.

The device shown in FIG. 2 thereby provides the same coding as the device shown in FIG. 1, but, while the lay-out of the circuits of the device according to FIG. 1 represented the coding introduced between the input e and the output s, the lay-out or topology of the circuits of FIG. 2 does not provide any information on the coding polynomial.

Such a lay-out remains the same whatever the polynomial introduced for the coding.

With reference to FIGS. 6 to 15, there is described an integrated circuit device usable for providing different logical functions, said device being adaptable for example for carrying out the invention.

Such a device (FIG. 6) comprises a first inverter $I_0$ made of the transistor $T_0$ the source $S_0$ of which is connected to earth and the circuit 111 of the drain $D_0$ of which comprises a resistive element 112; the grid $G_0$ on which is applied a first input $E_1$ of the circuit, is connected by a conductor 113 to a conductor 114 one end 115 of which is connected to the grid $G_1$ of a transistor $T_1$, the drain $D_1$ of which is connected by a conductor 116 to the drain $D_2$ of a transistor $T_2$, the source $S_1$ of transistor $T_1$ being connected to the source $S_2$ of transistor $T_2$ via a conductor 117. Transistors $T_1$ and $T_2$ form a first pair $P_1$ of transistors.

The device comprises a second pair $P_2$ of transistors $T_3$ and $T_4$, the constituent elements of which are connected between themselves as are the constituent elements of transistors $T_1$ and $T_2$ of the first pair $P_1$, through conductors 118, 119. Conductor 118 is connected to conductor 117 by a conductor 122. The grid $G_3$ of transistor $T_3$ is connected to the drain $D_0$ of transistor $T_0$ by a line 101.

The grid $G_2$ of transistor $T_2$ is connected by a circuit 123 to the grid $G_6$ of a transistor $T_6$ which is part of a third pair $P_3$ of transistors, the other transistors $T_5$ of said pair being connected to transistor $T_6$ in the same manner as are connected between themselves the transistors of a same pair $P_1$ and $P_2$, through conductors 124 and 125. The grid $G_5$ of transistor $T_5$ is connected to the circuit 114.

The fourth pair $P_4$ of transistors $T_7$ and $T_8$ is connected to pair $P_3$ in the same manner as pair $P_2$ is connected to pair $P_1$ via a conductor 126 connecting between themselves, on the one hand the conductor 125 connecting the source $S_5$ of transistor $T_5$ to source $S_6$ of transistor $T_6$, and on the other hand the conductor 128 connecting the source $S_7$ of transistor $T_7$ to the source $S_8$ of transistor $T_8$, the connector 129 connecting the drains of transistors $T_7$ and $T_8$ being connected to each by conductor 131. The grid $G_7$ of transistor $T_7$ is connected via a conductor 102 to the grid $G_3$ of transistor $T_3$.

The grid $G_4$ of transistor $T_4$ is connected by a conductor 134 to the grid $G_8$ of transistor $T_8$. The conductor 134 is connected by a conductor 135 to a second inverter $I_2$ made of a transistor $T_9$ the grid $G_9$ of which, on which is applied a second input $E_2$ of the circuit, is connected to conductor 135, the source $S_9$ to the earth, and the drain $D_9$ circuit 136 of which comprises a resistive element 137. The drain $D_9$ of transistor $T_9$ is connected by a conductor 103 to the grid $G_6$ of transistor $T_6$. The conductor 116 connecting the drains $D_1$ and $D_2$ of transistors $T_1$ and $T_2$ is connected by a conductor 132 to the conductor 124 which connects the drains $D_5$ and $D_6$ of transistors $T_5$ and $T_6$, the output S of the circuit being obtained on one end of a conductor 133, the other end of which is connected to conductor 132. A circuit 141, comprising a resistive element 142, is connected to conductors 132 and 133. The biasing voltage of the circuit, of logical level $+1$, is applied to conductors 111, 136, 141.

One establishes thus that a logical signal, for example A, applied to input $E_1$, is also applied to grids $G_1$ and $G_5$ and, inverted, to grids $G_3$ and $G_7$.

A logical signal, for example B, applied to the input $E_2$, is also applied to grids $G_4$ and $G_8$ and, inverted, to grids $G_2$ and $G_6$.

Such a logical circuit may be used for performing a multiplicity of logical functions without said functions appearing when analysing the topology of the circuit.

In the embodiment of FIG. 7, only the transistors $T_1$ and $T_4$ are operative transistors in the usual manner. The other transistors are of the type functioning as an open circuit or as a short-circuit according to an arrangement of some sort, under the condition that between the output S and the earth they do not establish any conductive circuit: thus, transistors $T_2$ and $T_3$ are open, transistors of pairs $P_3$ and $P_4$ being such that the circuit comprised between conductor 131 and conductor 132 is open, whatever the signals A and B.

In this embodiment, the logical circuit provides the NAND function. In fact, the output S is equal to 0 only if $A=1$ and $B=1$ and the circuit performs the logical operation:

$$S = \overline{A.B} = \overline{A} + \overline{B}$$

In the embodiment shown in FIG. 8, only the transistors $T_2$ and $T_3$ are in the first state, that is an operative or active state. The other transistors are in a state, either equivalent to an open circuit, or equivalent to a short-circuit, so that the circuit performs the OR logical function. The signals $\overline{A}$ and $\overline{B}$ are applied to the grids $G_3$ and $G_2$ and on the output S is present the following logical signal:

$$S = A + B$$

In the embodiment shown in FIG. 9, where transistors $T_1$ and $T_8$ are used, the logical circuit performs the NOR function, the pairs $P_2$ and $P_3$ being such that they form a short-circuit, and transistors $T_2$ and $T_7$ being open, this whatever the signals A and B.

In the embodiment shown in FIG. 10, where the transistors $T_3$ and $T_6$ are used, it performs the AND function.

In the embodiment shown in FIG. 11, where the transistor $T_1$ is used, it performs the NEGATION function or NOT-FUNCTION, the pair $P_2$ forming a short-circuit and the pairs $P_3$ and $P_4$ forming an open circuit, as well as transistor $T_2$.

In the embodiment shown in FIG. 12, where transistor $T_3$ is used, it performs the function $S=A$, whatever B is.

The logical circuit according to the invention may also perform complex functions.

In the embodiment shown in FIG. 13, where the transistors $T_2$, $T_3$, $T_5$ and $T_8$ are used, it performs the OR exclusive function, used for example in circuits 17 and 27 of FIG. 2.

In the embodiment shown in FIG. 14, where transistors $T_1$, $T_2$, $T_7$ and $T_8$ are used, it performs the ZERO or NULL function.

In the embodiment shown in FIG. 15, where transistors $T_1$, $T_3$, $T_6$ and $T_8$ are used, it performs the TRUTH function, transistors $T_2$, $T_4$, $T_5$, $T_7$ being open.

In FIG. 16 is shown a register R with several cells $151_1$, $151_2$, $151_3$, etc. A first logical circuit $C_1$ of the type shown in FIG. 6 has an input $152_1$ connected to the output $153_1$ of the first cell $151_1$ and a second input $154_1$ connected to the output $153_2$ of cell $151_2$. The output $155_1$ of the logical circuit $C_1$ is connected to the first input $152_2$ of a second logical circuit $C_2$ having a topology similar to that of logical circuit $C_1$, the second input $154_2$ of which is connected to the output $153_3$ of the third cell $151_3$, etc.

Such an assembly is adapted for introducing a polynomial coding according to a confidential key on information applied to the input e of the register by differentiating for example the functions of circuits $C_1$, $C_2$, etc. applied to the output bits of register R and of the preceding logical circuits. Said function differences cannot be detected by the configuration of the integrated circuit elements. It is therefore impossible to determine the coding by observation, even using an electron microscope, of the logical circuits and the conductors associated therewith.

When manufacturing a MOS integrated circuit "chip", the selection between the transistors which have to functions as transistors and those which have to functions as a short-circuit or a interrupter, is done by using extra masks during a doping phase, wherefrom results an adjustment of the doping agent action, said agent being chemical or physical.

The plating of the connections is the same, whatever the polynomial, as well also as the disposition of the transistors. It is therefore impossible, by observing the plating circuits or the present transistors, to be informed of the coding introduced by the device.

Such an encrypted or ciphered coding has a particularly interesting utilization in the constitution of an electronic circuit card usable for commercial and/or banking transaction, by making it very difficult, if not impossible, for a swindler, to determine the code used in the exchange of informations between the card and a terminal.

The device according to the invention is applicable to uses others than that of the credit cards or the buying cards.

We claim:

1. A logic integrated circuit comprising:
   input conductors;
   a plurality of logic gate means, each having at least one input and an output, and being interconnected with said input conductors;
   an output terminal connected to the output of one of the logic gate means;
   said logic gate means including active logic gate means, and passive logic gate means which are either short circuits or open circuits, said active logic gate means and passive logic gate means being visually indistinguishable from each other as a result of different dopant levels;
   whereby the physical observation of the logic means does not reveal the logic combination provided between said input conductors and said output terminal.

2. A circuit according to claim 1, further comprising a shift register having a serial input terminal, at least certain cells of the shift register being connected to said input conductors.

3. A circuit according to claim 2, wherein each of the input conductors is connected to a respective cell of the shift register.

4. A circuit according to claim 3, wherein said logic gate means includes:
   serially connected active and passive logic gate means, said passive logic gate means providing a permanent conductive circuit path, the first of said serially connected logic gate means connected to one of said input conductors, and the last of said serially connected logic gate means connected to said output terminal;
   parallel connected logic gate means, each of said parallel connected gate means having an input connected to a different one of said input conductors, and an output connected to a second input of one of said serially connected gate means;
   whereby said output terminal provides a coded output signal in response to a signal applied to said shift register, said parallel and serial logic gate means providing decoding of said shift register contents through visually indistinguishable passive and active logic gate means.

5. A circuit according to claim 4 wherein the active logic gate means of said serially connected logic gate means are exclusive -OR gates.

6. A circuit according to claim 4 wherein all of said parallel connected logic gate means are passive, being either short circuits, or open circuits.

7. A circuit according to claim 6 wherein the passive of said serially connected logic gate means have their second input connected to the output of the parallel connected logic gate means which are open circuits.

8. A circuit according to claim 1 wherein said logic gate means comprises MOS transistors, in which a different doping results in producing active transistors or passive transistors, said passive transistors being either short circuits or open circuits between their source and drain electrodes.

9. A circuit according to claim 8 wherein certain of the passive transistors have undoped regions.

10. A circuit according to claims 2, 3, 4, 5, 6 or 7 further comprising means enclosing said combinational logic integrated circuit to define a transaction card intended for carring out a transaction with a terminal, information exchange between the card and the terminal passing through said logic circuit.

11. An MOS logic integrated circuit comprising:
first and second input terminals E1, E2 adapted to receive respective logic signals relative to a common ground connection;
an output terminal;
first and second inverting MOS transistors having gates directly coupled to said first and second inputs, said transistors delivering as outputs inverted signals from said first and second inputs, respectively;
first and second processing MOS transistors having gates coupled to receive signals from said first input and to receive said inverted second input signal, respectively;
third and fourth processing MOS transistors having gates coupled to receive said inverted first input signal and to receive signals from said second input, respectively;
the source-drain paths of said first and secondprocessing MOS transistors being serially arranged with those of said third and fourth processing MOS transistors between said output terminal and a ground connection;
fifth and sixth processing MOS transistors arranged in source-drain parallel relationship and having gates coupled to said first input and to receive said inverted second input signal, respectively;
seventh and eighth processing MOS transistors having gates coupled to receive said inverted first input signal and to receive a signal from said second input, respectively;
the source-drain paths of said fifth and sixth processing MOS transistors being serially arranged with those of said seventh and eighth processing MOS transistors between said output terminal and ground connection;
at least one of said processing transitors being doped to be passive and inactive in response to its gate signal.

12. An MOS logic integrated circuit according to claim 11 wherein said passive transistor structure provides a short circuit.

13. An MOS logic integrated circuit according to claim 11 wherein said passive transistor structure defines an open circuit.

14. An MOS logic integrated circuit according to claim 11 wherein at least said first and fourth processing transistor are active, and at least said second and third processing transistor structures are open circuits, so as to define a NAND gate, the path through said fifth to eighth processing transistors comprising at least one open circuit transistor.

15. An MOS logic integrated circuit according to claim 11 wherein said first and second inverting transistors are active, at least said second and third processing transistors are active, at least said first and fourth processing transistors are open circuits so as to define an OR gate, and the path through said fifth to eighth processing transistors comprise at least two open circuit transistors.

16. An MOS logic integrated circuit according to claim 11 wherein at least one of said third and fourth and of said fifth and sixth processing transistors are short circuits, and said second and seventh processing transistors are passive open circuits, and the remaining transistors being active, so as to define a NOR gate.

17. An MOS logic integrated circuit according to claim 11 wherein said first and second inverting transistors are active, as well as the third and sixth processing transistors, the other transistors being passive and arranged for paralleling the third and sixth processing between the output terminal and the ground, so as to define an AND gate.

18. An MOS logic integrated circuit according to claim 11 wherein at least one of said third and fourth processing transistors is a short circuit, said fifth to eighth processing transistors being connected to define an open circuit, and the second processing transistors constitutes an open circuit whereby a NEGATION gate is defined.

19. An MOS logic integrated circuit according to claim 11 wherein at least one of said first and second processing transistors is a short circut, said fifth to eighth processing transistors being connected to define an open circuit, and the fourth transitor being an open circuit, whereby an EQUAL gate is formed.

20. An MOS logic integrated circuit according to claim 11 wheren said first, fourth, sixth and seventh processing transistors are open circuits whereby an EXCLUSIVE -OR gate is formed.

21. An MOS logic integrated circuit according to claim 11, wherein at least one of said third and fourth and of said fifth and sixth processing transistors are short circuits so as to define a logic FALSE gate.

22. An MOS logic integrated circuit according to claim 11 wherein the second, fourth, fifth and seventh processing transistors are open circuits so as to define a logical TRUE gate.

23. A logic integrated circuit of claim 1 wherein said logic gate means comprises:
a pair of transistors for providing inverted signals from a pair of said input conductors;
first and second MOS transistor means having respective gates, said first MOS transistor means gate connected to receive signals from one conductor of said conductor pair, said second MOS transistor means gate connected to receive an inverted signal of a remaining conductor of said conductor pair;
third and fourth MOS transistor means having respective gates, said third MOS transistor means having a gate coupled to receive said inverted signal from said one conductor of said pair, and said fourth MOS transistor means having a gate connected to receive a signal from said remaining conductor,
said first and second transistor means having source-drain connections in series respectively with said third and fourth transistor means source-drain connections;

fifth and sixth MOS transistor means, said fifth MOS transistor means having a gate coupled to receive a signal from said one conductor, and said sixth MOS transistor means having a gate connected to receive an inverted signal from said remaining conductor;

seventh and eighth MOS transistor means, said seventh MOS transistor means having a gate connected to receive an inverted signal from said one conductor, said eight MOS transistor means having a gate connected to receive a signal from said second input;

said fifth and sixth MOS transistor means having respective source-drain connections serially connected to said seventh and eighth MOS transistor means;

at least one of said MOS transistor means being doped to include at least one passive transistor visually undistinguishable from remaining transistors in said MOS transistor means.

* * * * *